(12) United States Patent
Ma et al.

(10) Patent No.: US 12,547,903 B2
(45) Date of Patent: Feb. 10, 2026

(54) HUMAN-COMPUTER INTERACTION METHOD AND APPARATUS, STORAGE MEDIUM AND ELECTRONIC DEVICE

(71) Applicant: BOE TECHNOLOGY GROUP CO., LTD., Beijing (CN)

(72) Inventors: Mingyuan Ma, Beijing (CN); Tianxin Liang, Beijing (CN); Wenchu Dong, Beijing (CN); Ken Wen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1098 days.

(21) Appl. No.: 17/439,758

(22) PCT Filed: Apr. 9, 2021

(86) PCT No.: PCT/CN2021/086274
§ 371 (c)(1),
(2) Date: Sep. 15, 2021

(87) PCT Pub. No.: WO2021/238447
PCT Pub. Date: Dec. 2, 2021

(65) Prior Publication Data
US 2022/0343183 A1    Oct. 27, 2022

(30) Foreign Application Priority Data
May 29, 2020    (CN) .......................... 202010474979.1

(51) Int. Cl.
*G06N 5/02*    (2023.01)
*G06F 16/21*    (2019.01)
(Continued)

(52) U.S. Cl.
CPC ............. *G06N 5/022* (2013.01); *G06F 16/21* (2019.01); *G06F 40/295* (2020.01); *G06N 5/04* (2013.01)

(58) Field of Classification Search
CPC .......... G06N 5/022; G06N 5/04; G06F 16/21; G06F 40/295
See application file for complete search history.

(56) References Cited

U.S. PATENT DOCUMENTS 8,533,182 B1 *   9/2013   Charboneau ...... G06F 16/90335
                                                        707/718
9,910,642 B2     3/2018   Salam et al.
(Continued)

FOREIGN PATENT DOCUMENTS

CN          105068661 A      11/2015
CN          105975506 A       9/2016
(Continued)

OTHER PUBLICATIONS

First Office Action for CN Patent Application No. 202010474979.1 mailed May 12, 2023.
(Continued)

*Primary Examiner* — Brittany N Allen
*Assistant Examiner* — Earl Levi Elias
(74) *Attorney, Agent, or Firm* — Perilla Knox & Hildebrandt LLP; Kenneth A. Knox

(57) ABSTRACT

The present disclosure provides a human-computer interaction method and apparatus, computer-readable storage medium and electronic device, and relates to the technical field of computer question answering. The human-computer interaction method includes receiving an input question; extracting entities and relationships involved in the input question; querying an answer to the input question in a knowledge graph according to the entities and the relationships; and displaying a sub-graph of the knowledge graph. The sub-graph of the knowledge graph includes entities involved in the input question and the answer, and a directional identifier, wherein the directional identifier is config- (Continued)

ured to identify a reasoning path corresponding to the query process.

19 Claims, 14 Drawing Sheets

(51) Int. Cl.
*G06F 40/295* (2020.01)
*G06N 5/022* (2023.01)
*G06N 5/04* (2023.01)

(56) References Cited

U.S. PATENT DOCUMENTS

| | | | |
|---|---|---|---|
| 10,845,937 B2* | 11/2020 | Anand | G06F 16/252 |
| 2003/0046095 A1* | 3/2003 | Jessop | G06Q 40/00 |
| | | | 705/35 |
| 2007/0118439 A1* | 5/2007 | Kumar | G06Q 30/0601 |
| | | | 705/26.1 |
| 2012/0158687 A1* | 6/2012 | Fang | G06F 16/338 |
| | | | 707/706 |
| 2014/0372956 A1* | 12/2014 | Bisca | G06F 3/04817 |
| | | | 715/848 |
| 2017/0220703 A1* | 8/2017 | Martha | G06T 11/206 |
| 2017/0344346 A1 | 11/2017 | Salam et al. | |
| 2018/0144424 A1* | 5/2018 | Sahu | G16H 10/20 |
| 2018/0329958 A1* | 11/2018 | Choudhury | G06F 16/2456 |
| 2019/0213284 A1* | 7/2019 | Anand | G06F 3/0484 |
| 2020/0004873 A1 | 1/2020 | Chang et al. | |
| 2020/0019613 A1* | 1/2020 | Bacarella | G06F 40/20 |
| 2021/0011913 A1* | 1/2021 | Chandramouli | G06F 16/9024 |

FOREIGN PATENT DOCUMENTS

| | | | |
|---|---|---|---|
| CN | 107357849 | A | 11/2017 |
| CN | 107451240 | A | 12/2017 |
| CN | 107977393 | A | 5/2018 |
| CN | 108536861 | A | 9/2018 |
| CN | 109033135 | A | 12/2018 |
| CN | 109857874 | A | 6/2019 |
| CN | 110046238 | A | 7/2019 |
| CN | 107451240 | B | 12/2019 |
| CN | 110532462 | A | 12/2019 |
| CN | 110781280 | A | 2/2020 |
| CN | 111639169 | A | 9/2020 |
| WO | 2020199701 | A1 | 10/2020 |

OTHER PUBLICATIONS

International Search Report for International Application No. PCT/CN2021/086274 mailed Jul. 7, 2021.
Written Opinion for International Application No. PCT/CN2021/086274 mailed Jul. 7, 2021.
Zeng, S. & Wang, S. & Yuan, Yong & Ni, X.-C & Ouyang, Y.-J, "Towards Knowledge Automation: A Survey on Question Answering Systems," Zidonghua Xuebao/Acta Automatica Sinica. 43. 1491-1508. 10.16383/j.aas.2017.c160667 (2017).
Liu Jiyuan, "Research on the Construction and Application of Knowledge Graph in Tourism Domain," Dissertation Submitted to Zhejiang University for the Degree of Master of Engineering (Apr. 2019).

* cited by examiner

HUMAN-COMPUTER INTERACTION METHOD AND APPARATUS, STORAGE MEDIUM AND ELECTRONIC DEVICE

CROSS-REFERENCES TO RELATED APPLICATIONS

The present application is a national phase application under 35 U.S.C. § 371 of International Application No. PCT/CN2021/086274 filed on Apr. 9, 2021, which is based on and claims priority to Chinese Patent Application No. 202010474979.1, filed on May 29, 2020, entitled "Human-Computer Interaction Method and Apparatus, Computer Readable Storage Medium and Electronic Device," the contents of both of which are hereby incorporated by reference in their entireties herein.

TECHNICAL FIELD

The present disclosure relates to the technical field of computer question answering and, in particular, to a human-computer interaction method, a human-computer interaction apparatus, an electronic device, and a non-transitory computer-readable storage medium.

BACKGROUND

With the continuous development of computer question answering technology, its practical application has become increasingly mature. It has been successfully applied to human-computer interaction bringing many conveniences to people's production, life, and daily entertainment.

However, most existing question answering solutions have various difficulties, such as low accuracy and flexibility, low visualization in the interaction process, and poor interaction effects.

The information disclosed in the above background section is only used to enhance the understanding of the background of the present disclosure, and therefore may include information that does not constitute the prior art known to those of ordinary skill in the art.

SUMMARY

The embodiments of the present disclosure provide a human-computer interaction method and apparatus, electronic device, and computer-readable storage medium, which can display the reasoning process of obtaining the answer in the display area while returning the queried answer.

According to a first aspect of the present disclosure, there is provided a human-computer interaction method, including:
  receiving an input question;
  extracting entities and relationships involved in the input question, and querying an answer to the input question in a knowledge graph according to the entities and the relationships; and
  displaying a sub-graph of the knowledge graph, wherein the sub-graph of the knowledge graph includes entities involved in the input question and the answer, and a directional identifier, wherein the directional identifier is configured to identify a reasoning path corresponding to the query process.

In an exemplary embodiment of the present disclosure, the directional identifier is configured to connect entities that are successively went through in the query process.

In an exemplary embodiment of the present disclosure, as for a situation where the input question is a multi-order reasoning question, the directional identifier includes a multi-level directional identifier to distinguish the successively corresponding reasoning path of each order in the query process;
  any two of the multi-level directional identifiers have at least one of different colors, sizes, and shapes.

In an exemplary embodiment of the present disclosure, the directional identifier is a directional arrow.

In an exemplary embodiment of the present disclosure, the directional identifier is represented by a plurality of entities with different attributes that are successively went through in the query process, and the attribute includes at least one of color, size, and shape.

In an exemplary embodiment of the present disclosure, as for a situation where the input question is greater than or equal to a second round of question and answer interaction, displaying a sub-graph of the knowledge graph includes:
  judging whether the input question and the answer involve a new entity compared with the input question and answer of a previous round of interaction;
  updating the new entity and the corresponding directional identifier to the sub-graph of the knowledge graph obtained in the previous round of interaction, and displaying an updated sub-graph of the knowledge graph, if it involves a new entity;
  serving the sub-graph of the knowledge graph obtained in the previous round of interaction as the sub-graph of the knowledge graph, and updating the directional identifier, if it does not involve a new entity.

In an exemplary embodiment of the present disclosure, the method further includes:
  displaying differentially the reasoning paths corresponding to different input questions based on the directional identifier.

In an exemplary embodiment of the present disclosure, when the sub-graph of the knowledge graph is displayed, the method further includes:
  acquiring at least one of user attribute data, user behavior data, and operation data, wherein the user attribute data includes at least one of age, gender, and purchasing power of a user, and the user behavior data includes historical search data;
  acquiring a recommended object according to at least one of the user attribute data, the user behavior data, and the operation data;
  displaying differentially the recommended object relative to the entity in the sub-graph of the knowledge graph.

In an exemplary embodiment of the present disclosure, displaying differentially the recommended object relative to the entity in the sub-graph of the knowledge graph includes:
  displaying differentially a target entity by color filling or a symbol mark in the sub-graph of the knowledge graph, wherein the target entity is an entity connected to the recommended object through a relationship;
  receiving a control operation acting on the target entity, and displaying the recommended object based on the control operation.

In an exemplary embodiment of the present disclosure, displaying differentially the recommended object relative to the entity in the sub-graph of the knowledge graph includes:
  displaying the recommended object and a relationship connected to the recommended object with a dashed line, wherein the recommended object is displayed in the sub-graph of the knowledge graph in a form of an entity; or, popping up a message prompt window, and displaying the recommended object in the message prompt window.

In an exemplary embodiment of the present disclosure, displaying a sub-graph of the knowledge graph includes:
selecting among the entities involved in the input question and the answer according to a preset screening rule;
displaying the sub-graph of the knowledge graph, wherein the sub-graph of the knowledge graph includes the selected entity and the directional identifier.

In an exemplary embodiment of the present disclosure, selecting among the entities involved in the input question and the answer according to a preset screening rule includes:
in response to a control operation of a user, selecting a display state of the entity and its related entities according to the control operation,
wherein selecting a display state of the entity and its related entities according to the control operation includes:
in response to a selection operation acting on an entity, hiding a branch centered on the entity and displaying a hidden icon, wherein the branch includes all entities, relationships, and directional identifiers connected to the entity; or,
in response to a selection operation acting on a relationship, hiding all the entities connected to the relationship and displaying the hidden icon.

According to a second aspect of the present disclosure, there is provided a human-computer interaction apparatus, including:
an input device, configured to receive an input question;
a processor, configured to extract entities and relationships involved in the input question, and query an answer to the input question in a knowledge graph according to the entities and the relationships; and
a display, configured to display a sub-graph of the knowledge graph, wherein the sub-graph of the knowledge graph includes entities involved in the input question and the answer, and a directional identifier, wherein the directional identifier is configured to identify a reasoning path corresponding to the query process.

According to a third aspect of the present disclosure, there is provided a computer-readable storage medium with a computer program stored thereon, which when executed by a processor implements the method of any one of the above.

According to a fourth aspect of the present disclosure, there is provided an electronic device, including:
a processor;
a memory for storing instructions executable by the processor,
wherein, the processor is configured to execute the method according to any one of the above by executing executable instructions.

It should be noted that the above general description and the following detailed description are merely exemplary and explanatory and should not be construed as limiting of the present disclosure.

BRIEF DESCRIPTION OF THE DRAWINGS

The drawings herein are incorporated into the specification and constitute a part of the specification, show embodiments in accordance with the disclosure, and are used to explain the principle of the disclosure together with the specification. The drawings in the following description are only some embodiments of the present disclosure. For those of ordinary skill in the art, other drawings can be obtained based on these drawings without creative work.

DETAILED DESCRIPTION

Figure 1:
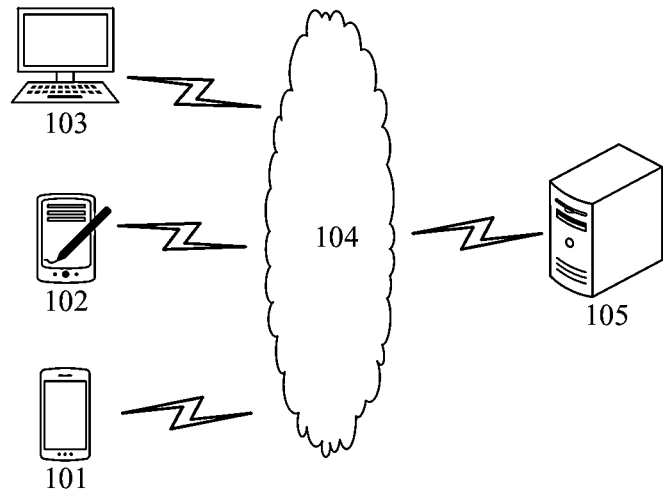
FIG. 1 shows a schematic diagram of an exemplary system architecture of a human-computer interaction method and apparatus to which the embodiments of the present disclosure can be applied.

Example embodiments will now be described more fully with reference to the accompanying drawings. However, the example embodiments can be implemented in various forms, and should not be construed as being limited to the examples set forth herein; on the contrary, the provision of these embodiments makes the present disclosure more comprehensive and complete, and fully conveys the concept of the example embodiments to those skilled in the art. The described features, structures or characteristics can be combined in one or more embodiments in any suitable way. In the following description, many specific details are provided to give a sufficient understanding of the embodiments of the present disclosure. However, those skilled in the art will realize that the technical solutions of the present disclosure can be practiced without one or more of the specific details, or other methods, components, devices, steps, etc. can be used. In other cases, well-known technical solutions are not shown or described in detail in order to avoid overwhelming and obscuring all aspects of the present disclosure.

In addition, the drawings are only schematic illustrations of the present disclosure, and are not necessarily drawn to scale. The same reference numerals in the figures denote the same or similar parts, and thus their repeated description will be omitted. Some of the block diagrams shown in the drawings are functional entities and do not necessarily correspond to physically or logically independent entities. These functional entities may be implemented in the form of software, or implemented in one or more hardware modules or integrated circuits, or implemented in different networks and/or processor devices and/or microcontroller devices.

FIG. 1 shows a schematic diagram of a system architecture of an exemplary application environment in which a human-computer interaction method and apparatus to which embodiments of the present disclosure can be applied.

As shown in FIG. 1, the system architecture 100 may include one or more of terminal devices 101, 102, and 103, as well as a network 104 and a server 105. The network 104 is used to provide a medium for communication links between the terminal devices 101, 102, 103 and the server 105. The network 104 may include various connection types, such as wired, wireless communication links, or fiber optic cables, and so on. The terminal devices 101, 102, 103 may be various electronic devices with display screens, including but not limited to desktop computers, portable computers, smart phones, tablet computers, and so on. It should be understood that the numbers of terminal devices, networks, and servers in FIG. 1 are merely illustrative. According to implementation needs, there can be any number of terminal devices, networks, and servers. For example, the server 105 may be a server cluster composed of a plurality of servers, or the like.

The human-computer interaction method provided by the embodiments of the present disclosure can be executed by the terminal devices 101, 102, 103, and accordingly, the human-computer interaction apparatus can be provided in the terminal devices 101, 102, 103. The human-computer interaction method provided by the embodiment of the present disclosure can also be executed by the server 105, and accordingly, the human-computer interaction apparatus can be set in the server 105. The human-computer interaction method provided by the embodiments of the present disclosure can also be executed jointly by the terminal devices 101, 102, 103 and the server 105. Accordingly, the human-computer interaction apparatus can be set in the terminal devices 101, 102, 103 and the server 105. This is not particularly limited in the exemplary embodiment.

For example, in this exemplary embodiment, the user can input a question through the terminal devices 101, 102, 103. After the terminal devices 101, 102, and 103 obtain the input question, the entities and relationships involved in the input question are extracted, and sent to the server 105 through the network 104. After receiving the above-mentioned entity and relationship, the server 105 quires the answer to the above input question in the knowledge graph according to the entity and relationship. At the same time, a sub-graph of the knowledge graph is obtained, the sub-graph of the knowledge graph contains the entities involved in the input question and the answer and the directional identifier, and the directional identifier is configured to identify the reasoning path corresponding to the query process. Finally, the obtained sub-graph of the knowledge graph is sent to the terminal devices 101, 102, 103 through the network 104, and the terminal devices 101, 102, 103 receive the sub-graph of the knowledge graph and display the sub-graph of the knowledge graph.

Figure 2:
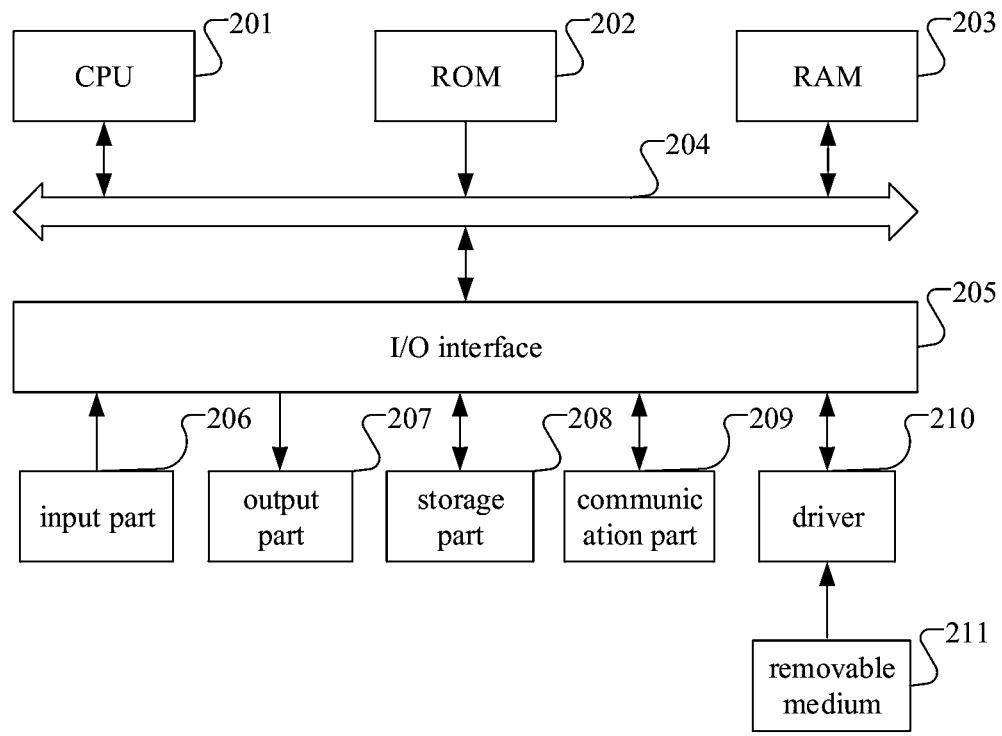
FIG. 2 shows a schematic structural diagram of a computer system suitable for implementing an electronic device according to an embodiment of the present disclosure.

FIG. 2 shows a schematic structural diagram of a computer system suitable for implementing an electronic device according to an embodiment of the present disclosure.

It should be noted that the computer system 200 of the electronic device shown in FIG. 2 is only an example, and should not bring any limitation to the functions and scope of use of the embodiments of the present disclosure.

As shown in FIG. 2, the computer system 200 includes a central processing unit (CPU) 201, which can perform various appropriate actions and processing according to programs stored in a read-only memory (ROM) 202 or programs loaded from a storage part 208 into a random access memory (RAM) 203. In the RAM 203, various programs and data required for system operation are also stored. The CPU 201, the ROM 202, and the RAM 203 are connected to each other through a bus 204. An input/output (I/O) interface 205 is also connected to the bus 204.

The following components are connected to the I/O interface 205: an input part 206 including a keyboard, a mouse, etc.; an output part 207 including a cathode ray tube (CRT), a liquid crystal display (LCD), etc., and a speaker, etc.; a storage part 208 including a hard disk, etc.; and a communication part 209 including a network interface card such as a LAN card, a modem, and the like. The communication part 209 performs communication processing via a network such as the Internet. The driver 210 is also connected to the I/O interface 205 as needed. A removable medium 211, such as a magnetic disk, an optical disk, a magneto-optical disk, a semiconductor memory, etc., is installed on the driver 210 as needed, so that the computer program read from it is installed into the storage part 208 as needed.

With the continuous development of computer question answering technology, its practical application has become increasingly mature. It has been successfully applied to human-computer interaction, bringing many conveniences to people's production, life, and daily entertainment.

However, most existing question answering has questions such as low accuracy and flexibility, low visualization of the interaction process, and poor interaction effects. In order to solve the above-mentioned questions, the inventors tried to combine knowledge graphs with computer question answering technology, and proposed a method of completing the human-computer interaction process based on graph knowledge bases.

Although the automatic question answering based on the knowledge graph solves the question of low accuracy and flexibility in the question answering process, the user can only get the answer to the input question, but cannot obtain the reasoning path of acquiring the answer. The visualization of the interaction process is still relatively low, and the interaction effect is also affected to a certain extent. At the same time, as the conversation progresses, the number of involved entities increases. If the knowledge graph containing all entities is displayed in the display area, it will cause questions such as poor display effect and users' inability to quickly obtain important information. In addition, how to make relevant recommendations based on input questions and user-related information is also very important for practical applications.

In order to solve the above questions, in this exemplary embodiment, the inventor proposes a new technical solution. The technical solution of the embodiment of the present disclosure is described in detail below.

Figure 3:
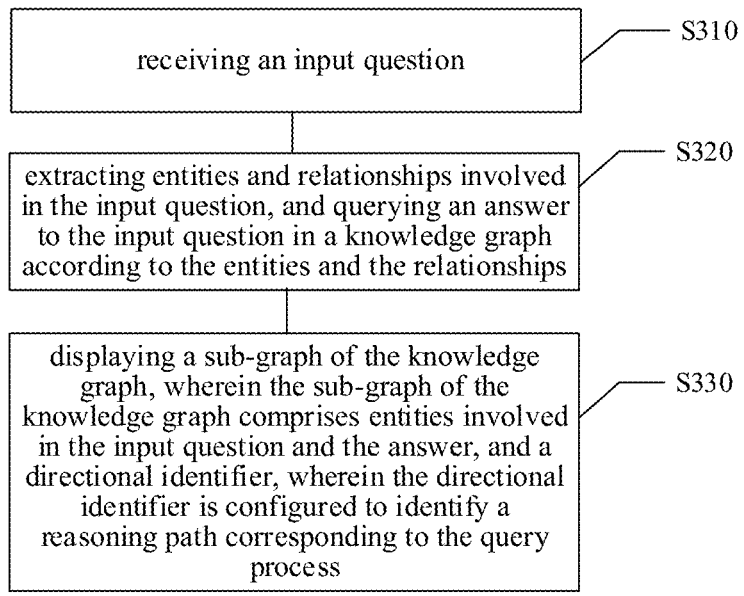
FIG. 3 schematically shows a flowchart of a process of a human-computer interaction method according to an embodiment of the present disclosure.

This exemplary embodiment first provides a human-computer interaction method. The human-computer interaction method is shown in FIG. 3 and specifically includes following steps:

S310, receiving an input question;

S320, extracting entities and relationships involved in the input question, and querying an answer to the input question in a knowledge graph according to the entities and the relationships; and S330, displaying a sub-graph of the knowledge graph, wherein the sub-graph of the knowledge graph includes entities involved in the input question and the answer, and a directional identifier, wherein the directional identifier is configured to identify a reasoning path corresponding to the query process.

In the human-computer interaction method provided by the exemplary embodiment of the present disclosure, on the one hand, in the human-computer interaction method provided by the exemplary embodiment, since the directional identifier is configured, the reasoning path corresponding to the above-mentioned query process can be identified, and then the user can intuitively see the process of querying the input question, which improves the effect of human-computer interaction. On the other hand, the method also displays the entities involved in the input questions and answers and the directional identifiers in the form of the sub-graph of the knowledge graph, thereby helping users to obtain effective information, increasing screen utilization, and improving display effects.

Hereinafter, in another embodiment, the above steps are described in more detail.

In step S310, an input question is received.

In this exemplary embodiment, the user inputs the input question to the human-computer interaction system through the terminal device, and the input question is a question for which the user wants to query an answer. For example, it can be a first-order question, such as "which year was painter A born in", or a second-order question, such as "who are painters having the same nationality as the painter A". In addition, the input question can also be a higher order question. It should be noted that the input question listed above is only an exemplary description, and does not limit the protection scope of the exemplary embodiment. The input question may also be any other question that the user wants to know. In addition, the foregoing terminal device may be a smart phone, a tablet computer, or other terminals such as a notebook, which is not particularly limited in the exemplary embodiment.

In this exemplary embodiment, the knowledge related to the input question is stored in a knowledge graph in the form of an entity. The knowledge graph is a structured semantic knowledge base and provides a way of storing and querying knowledge. The entities and relationships connected with the entities are stored in the semantic knowledge base. Taking triples as an example, the basic unit of composition can be a storage manner of (entity, relationship, entity). For example, "painter A's nationality is country B" can be expressed in the semantic database as (painter A, nationality, country B), where "painter A" is an entity, "nationality" is a relationship, and "country B" is another entity connected to the entity "painter A" through the relationship "nationality". It should be noted that the above scenario is only an exemplary description, and does not limit the protection scope of the exemplary embodiment.

In this example embodiment, the structured semantic knowledge base of the knowledge graph may be a graph database storing data in the form of triples, and the graph database may be any open source graph database or a commercial graph database. For example, the database may be Neo4j, Apache Jena, or Gstore, and this example implementation does not have special requirements.

In step S320, entities and relationships involved in the input question are extracted, and an answer to the input question is queried in a knowledge graph according to the entities and the relationships.

In this exemplary embodiment, after receiving the input question input by the user, the terminal device needs to extract the entities and relationships involved in the input question, and then can query the answer to the input question in the above-mentioned knowledge graph. The above-mentioned entities can be extracted through a data dictionary, and the above-mentioned relationships can be finally extracted through steps such as entity replacement, generalizing questions, and intent recognition model processing.

In addition, depending on difference of the input questions, the combination of extracted entities and relationships will be also different. For example, it may be single entity single relationship, single entity multiple relationships, multiple entities single relationship or multiple entities multiple relationships. For example, as for the input question "which year was painter A born in", the extracted entity is "painter A", and the extracted relationship is "year of birth", which is a combination of single entity single relationship. For another example, as for the input question "who are painters having the same nationality as the painter A" is a second-order question. The entity and relationship involved in the input question can be stored in the knowledge graph database in the form of (painter A, nationality, country B), (Country B, painter, painter C), where there may be a plurality of painters C. That is, the entities extracted by the input question include painter A, the country to which painter A belongs, and other painters belonging to the same country, and the relationship is nationality, painter, then the input question corresponds to a combination of multiple entities multiple relationships. In the same way, the input question may also be a combination of single entity multiple relationships or multiple entities single relationship, which belong to the protection scope of this example embodiment.

The above example is only an example description, which is not limited by this example embodiment.

In this exemplary embodiment, after the entities and relationships involved in the above-mentioned input question are extracted, the entities related to the above-mentioned input question can be queried in the above-mentioned knowledge graph based on the extracted entities and relationships, and the entities related to the above-mentioned input question can be organized into an answer for output. Taking "which year was painter A born in" as an example, the specific implementation can be to extract the entity "painter A" and the relationship "year of birth" corresponding to the input question, and obtain the basic composition of the entity and the relationship (painter A, year of birth, 1953) from the graph database of the knowledge graph, so the answer to the input question can be obtained as 1953. To further organize it to get the answer, it will obtain "painter A's birth year is 1953". It should be noted that the above scenario is only an exemplary description, and the protection scope of the exemplary embodiment is not limited to this.

In step S330, a sub-graph of the knowledge graph is displayed, wherein the sub-graph of the knowledge graph includes entities involved in the input question and the answer, and a directional identifier, wherein the directional identifier is configured to identify a reasoning path corresponding to the query process.

In this exemplary embodiment, the sub-graph of the knowledge graph corresponding to the above input question may be further obtained from the graph database of the knowledge graph and displayed.

The sub-graph of the knowledge graph may include entities involved in the input question and answer and directional identifiers. The implementation of displaying entities in the above knowledge graph is as follows.

When the question answering is a single round of dialogue or the first round of question answering interaction in multiple rounds of dialogue, the implementation of acquiring the sub-graph of the knowledge graph is: extracting the entity involved in the input question and displaying the sub-graph of the knowledge graph containing the entity.

When the question answering is multiple rounds of dialogue, and the input question is the second round and a higher round of question answering interaction in the multiple rounds of dialogue, the implementation process of obtaining the sub-graph of the knowledge graph from the graph database of the knowledge graph and displaying it can be as follows: judging whether the input question and the answer of the current round of interaction involve a new entity compared with the input question and answer of a previous round of interaction; if it involves a new entity, updating the new entity and the corresponding directional identifier to the sub-graph of the knowledge graph obtained in the previous round of interaction, and displaying an updated sub-graph of the knowledge graph; if it does not involve a new entity, serving the sub-graph of the knowledge graph obtained in the previous round of interaction as the sub-graph of the knowledge graph, and updating the directional identifier.

Figure 4:
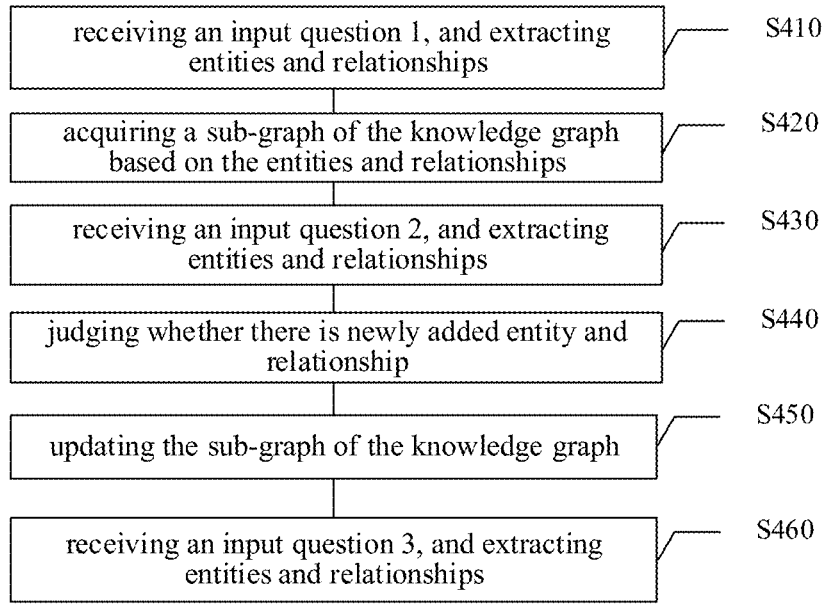
FIG. 4 schematically shows a flowchart of a process of updating a sub-graph of a knowledge graph according to an embodiment of the present disclosure.

The following takes a three-round dialogue as an example to further elaborate on the update process of the above sub-graph of the knowledge graph. The input questions corresponding to the three-round dialogue are: the input question 1 "which year was painter A born in"; the input question 2 "who are painters having the same nationality as the painter A"; the input question 3 "what is the representative work of painter A". The update process is shown in FIG. 4 and includes the following steps.

In S410, the input question 1 is received, and the entities and relationships included in the input question 1 and the answer 1 are extracted.

In this step, the input question 1: "which year was painter A born in" is received, and the input question 1 is extracted, and the entity involved is "painter A" and the relationship involved is "year of birth".

In step S420, a sub-graph of the knowledge graph is obtained according to the entity and the relationship.

Figure 5:
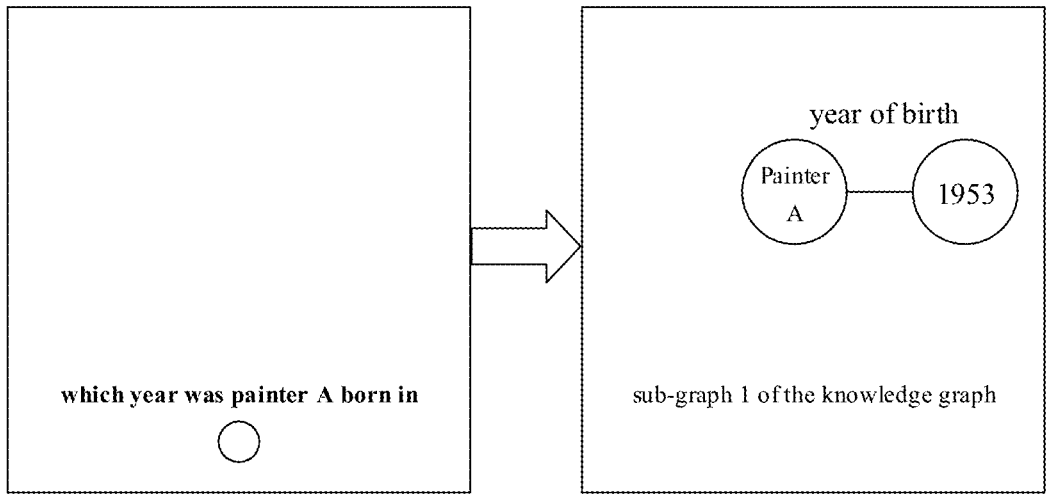
FIG. 5 schematically shows a schematic diagram of acquiring a sub-graph 1 of the knowledge graph according to an embodiment of the present disclosure.
Figure 6:
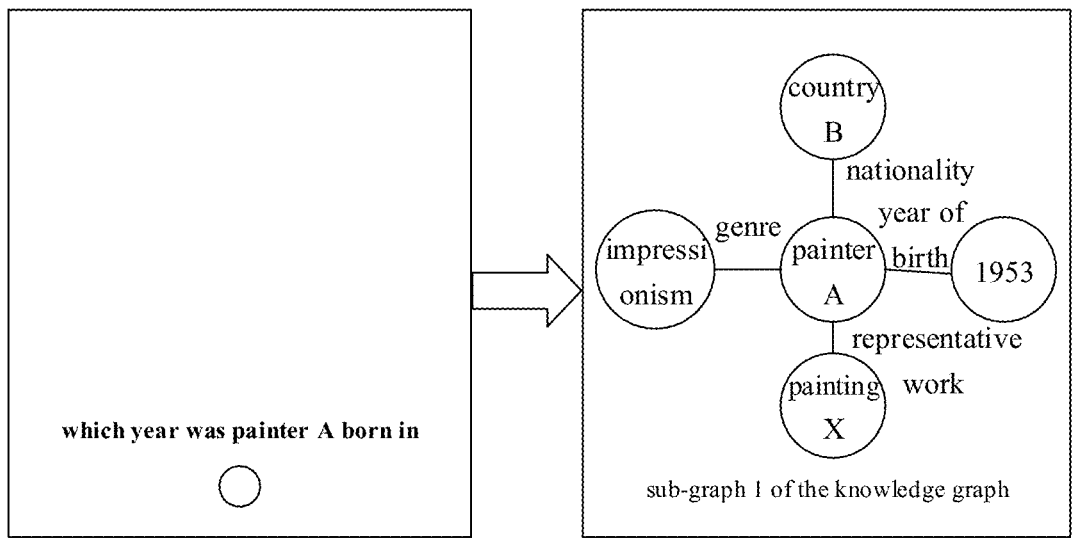
FIG. 6 schematically shows a schematic diagram of acquiring a sub-graph 1 of the knowledge graph according to an embodiment of the present disclosure.

In this step, the entities "painter A", "1953" and the relationship "year of birth" involved in the input question 1 and answer 1 are extracted from the above step S410, and the sub-graph of the knowledge graph containing the entities "painter A", "1953" and the relationship "year of birth" is obtained in the above graph database of the knowledge graph, as shown in FIG. 5. In addition, optionally, the knowledge graph may also include other relationships connected to the entity involved in the input question 1. As shown in FIG. 6, the sub-graph 1 of the knowledge graph may also include other relationships connected to the entity "painter A", i.e., "nationality", "genre" and "representative work", and other entities connected with the above relationships, such as "country B", "1953", "painting X" and "impressionism". For the convenience of description, in this exemplary embodiment, the subsequent steps use the sub-graph of the knowledge graph shown in FIG. 6 as the sub-graph 1 of the knowledge graph.

In step S430, the input question 2 is received, and the entities and relationships included in the input question 2 and the answer 2 are extracted.

In this step, the input question 2 "who are painters having the same nationality as the painter A" is received, and entities and relationships are extracted based on the input question 2 and the corresponding answer, to obtain the entities "painter A", "country B", "painter H", "painter L", and the relationships "nationality", "painter".

In step S440, it is determined whether there are newly added entities and relationships.

In this step, it is determined whether the input question 2 involves a new entity and relationship, and if yes, skipping to step S450, otherwise, keeping the current sub-graph of knowledge graph unchanged. Compared with the sub-graph 1 of the knowledge graph shown in FIG. 6 obtained in step S420, as for the input question 2 and the corresponding answer 2, the entities "painter H", "painter L" are added, and the relationship "painter" is added, thus skipping to step S450.

In step S450, the sub-graph of the knowledge graph is updated.

Figure 7:
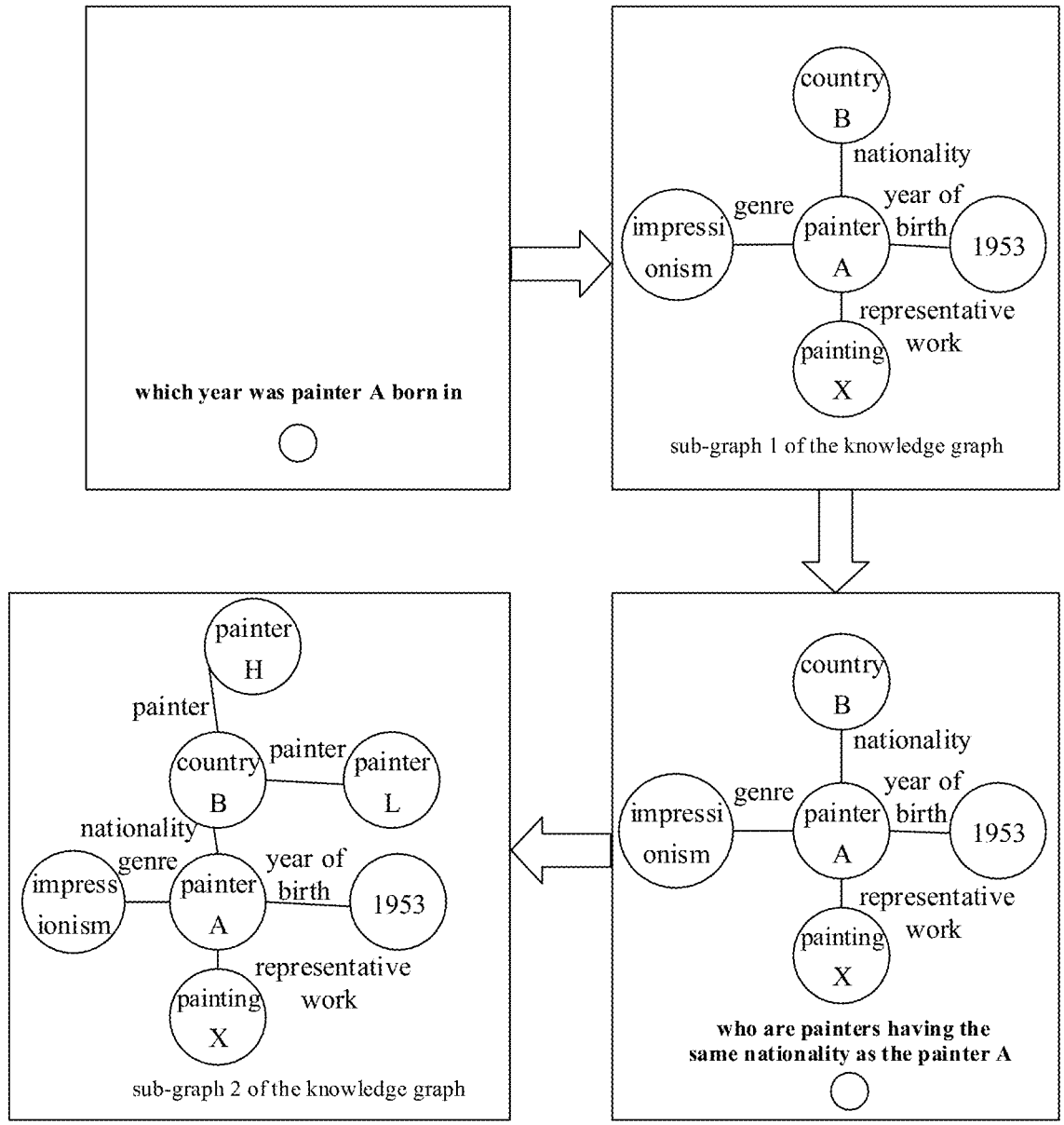
FIG. 7 schematically shows a schematic diagram of acquiring a sub-graph 2 of the knowledge graph according to an embodiment of the present disclosure.

In this step, the newly added entities and relationships are updated to the sub-graph of the knowledge graph. In step S440, it is determined that as for the input question 2 and answer 2, the entities "painter H", "painter L" are newly added, and the relationship "painter" is newly added. The updated sub-graph 2 of the knowledge graph is shown in FIG. 7, which newly adds the relationship "painter" connected to the entity "country B" and the entities "painter L", "painter H" connected to the relationship on the basis of the sub-graph 1.

In step S460, the input question 3 is received, and the entities and relationships included in the input question 3 and the answer 3 are extracted.

In this step, the input question 3 "what is the representative work of painter A" is received, and the entities and relationships are extracted according to the input question 2 and the corresponding answer, to obtain the entities "painter A", "painting X" and the relationship "representative work".

After obtaining the entities included in the input question 3 and the answer, skip to step S440 to perform the same judgment and update process as the input question 2. In this scenario, since it is determined that the input question 3 and answer 3 do not involve new entities and relationships compared with the sub-graph 1 of the knowledge graph shown in FIG. 6, the sub-graph 2 of the knowledge graph remains unchanged.

It should be noted that the above scenario is only an exemplary description, and the protection scope of this example embodiment is not limited to this. The above process is also suitable for more than three rounds of interaction. For higher-order input questions, the update process of the knowledge graph is the same. In addition, the above-mentioned input question may also be any other question that the user wants to inquire, which is not particularly limited in this exemplary embodiment.

In this example embodiment, the above sub-graph of the knowledge graph further includes a directional identifier, which connects each entity that goes through the process of querying an answer, and is used to identify the reasoning path corresponding to the above-mentioned query process. The directional identifier, for example, may be a directional arrow, or may be represented by multiple entities with different attributes that are successively went through in the query process, where the attributes include at least one of color, size, and shape. In addition, the directional identifier can also be in any form that conforms to the above definition, which is not particularly limited in the exemplary embodiment.

Through the above-mentioned directional identifier, the user can intuitively see the process of querying the input question, i.e., the reasoning path. Taking the above directional identifier as a directional arrow as an example, the realization of identifying the reasoning path can be as follows.

Figure 8:
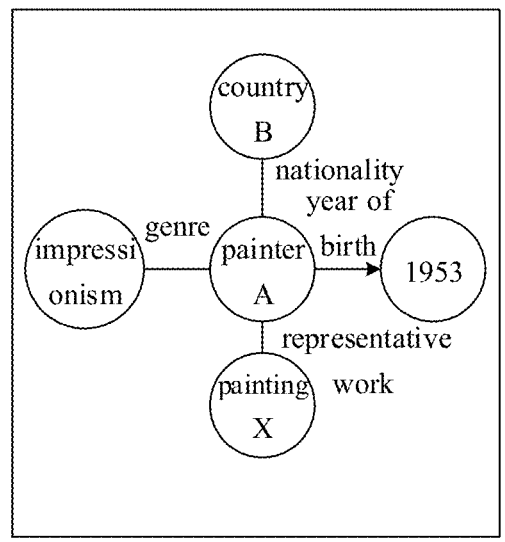
FIG. 8 schematically shows a schematic diagram of obtaining a reasoning path corresponding to the input question 1 according to an embodiment of the present disclosure.

When the question answering is a single round of dialogue or the first round of question answering interaction in multiple rounds of dialogue, taking the input question 1 "which year was painter A born in" as an example, as shown in FIG. 8, the extracted corresponding entity is "painter A", the relationship is "year of birth". The entity corresponding to the answer obtained based on this entity and relationship should be the entity "1953" connected to the above relationship "year of birth", the entity "painter A" is connected with the entity "1953" by the directional arrow in the above obtained knowledge graph. The path connected by the directional arrow starting from "painter A" and ending at "1953" is the reasoning path corresponding to the input question.

When the question answering is multiple rounds of dialogue, and the input question is the second round and a higher round of question answering interaction in the multiple rounds of dialogue, the implementation process of identifying the reasoning path can be as follows: querying the answer to the input question, and connecting successively the entities went through in the query process with the directional arrow in the updated sub-graph of the knowledge graph, to obtain the reasoning path corresponding to the query process.

Figure 9:
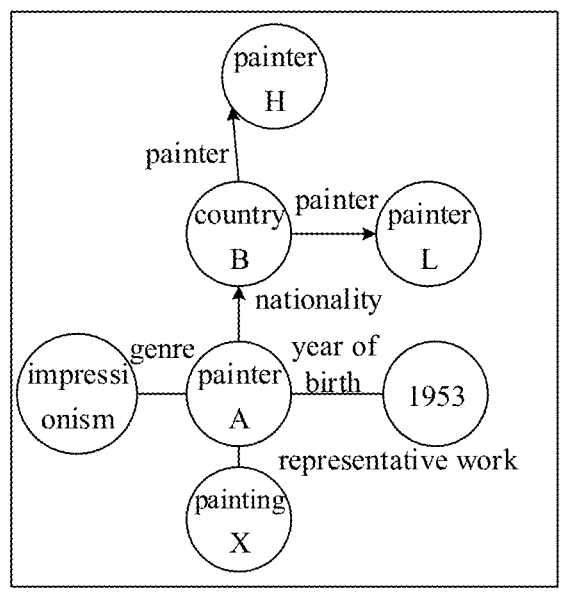
FIG. 9 schematically shows a schematic diagram of obtaining a reasoning path corresponding to the input question 2 according to an embodiment of the present disclosure.

On the basis of the input question 1, taking the above input question 2 "who are painters having the same nationality as the painter A" as an example, the input question 2 corresponds to the updated sub-graph 2 of the knowledge graph. The input question is a second-order question, that is, it needs two rounds of inference to find the corresponding answer. As shown in FIG. 9, firstly, according to the entity "painter A" and the relationship "nationality", the country B to which painter A belongs is obtained, and the entity "painter A" is connected with the entity "country B" obtained by the query with a directional arrow, and then the answers "painter L" and "painter H" to the second-order question is obtained based on the entity "country B" and the relationship "painter", and continue to connect the entities "country B" and "painter L", and the entities "country B" and "painter H" respectively with directional arrows. The paths connected by the directional arrows that start from "painter A" and end at "painter L", and start from "painter A" and end at "painter H" are the reasoning paths corresponding to the query process of the input question 2.

As shown in the input question 2 above, when the answer to the input question needs to be obtained through multi-order reasoning and the question is a second-order and a higher order question, when the above reasoning process is identified, different orders of reasoning can be displayed differentially. This can be implemented as follows: the above-mentioned directional identifier includes a multi-level directional identifier to distinguish the successively corresponding reasoning paths in the query process; wherein, the multi-level directional identifier has at least one of different colors, sizes, and shapes.

Figure 10:
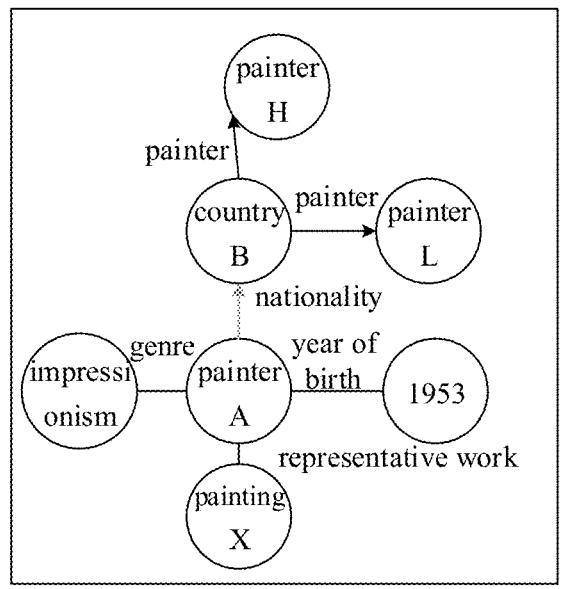
FIG. 10 schematically shows a schematic diagram of obtaining a reasoning path corresponding to the input question 2 according to an embodiment of the present disclosure.
Figure 11:
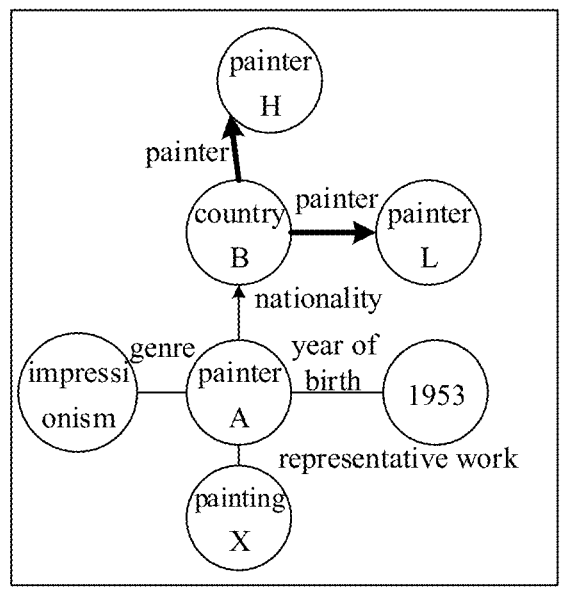
FIG. 11 schematically shows a schematic diagram of obtaining a reasoning path corresponding to the input question 2 according to an embodiment of the present disclosure.
Figure 12:
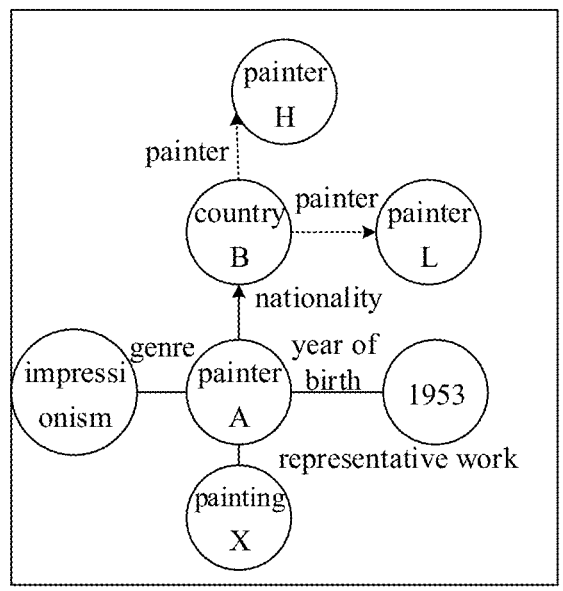
FIG. 12 schematically shows a schematic diagram of obtaining a reasoning path corresponding to the input question 2 according to an embodiment of the present disclosure.

Taking the input question 2 above as an example, the question "who are painters having the same nationality as the painter A" includes a two-order reasoning process. As mentioned above, first, the country B to which painter A belongs is acquired. This process is a first-order reasoning process, which can be identified by the first-level directional identifier; then, other painters, i.e., painter L and painter H, corresponding to the country B are obtained. It is a second-order reasoning process from country B to painter L and from country B to painter H, which can be identified by the second-level directional identifier. For example, the first-level directional identifier and the second-level directional identifier may be directional identifiers with different colors, as shown in FIG. 10, the first-level directional identifier is a gray arrow, and the second-level directional identifier is a black arrow. The first-level directional identifier and the second-level directional identifier may also be directional identifiers with different sizes, as shown in FIG. 11, the second-level directional identifier is a directional arrow whose size is larger than the first-level directional identifier. The first-level directional identifier and the second-level directional identifier may also be directional identifiers with different shapes, as shown in FIG. 12, the first-level directional identifier is a solid arrow, and the second-level directional identifier is a dashed arrow. In addition, it may be also other colors, sizes, and shapes, or any combination of colors, sizes, and shapes, which is not particularly limited in this exemplary embodiment.

It should be noted that the above scenario is only an exemplary description, and the higher-order reasoning process and the corresponding more levels of directional identifiers also belong to the protection scope of this example embodiment.

Figure 13:
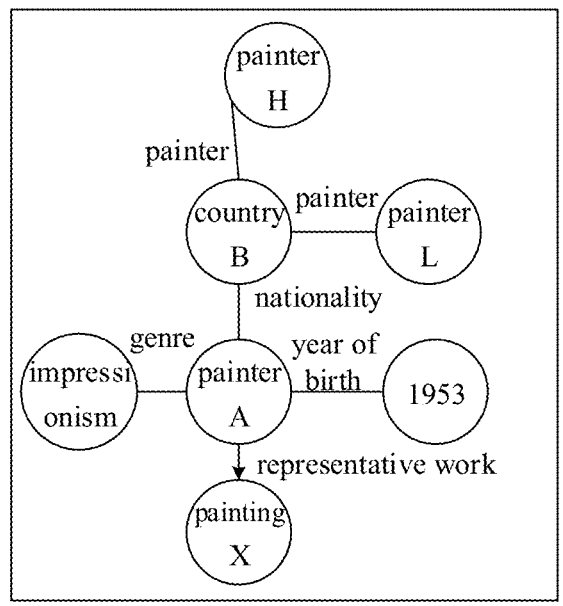
FIG. 13 schematically shows a schematic diagram of obtaining a reasoning path corresponding to the input question 3 according to an embodiment of the present disclosure.

When continuing to query the answer to the input question 3 "what is the representative work of painter A", since there are no new added entities and relationships, the reasoning path corresponding to input question 3 is directly marked in the sub-graph 2 of the knowledge graph, as shown in FIG. 13. Based on the same logic, the path connected by directional arrows starting from "painter A" and ending at "painting X" is the reasoning path corresponding to the input question 3.

In this example embodiment, the above-mentioned directional identifier for identifying the reasoning path may also be represented by multiple entities with different attributes that are successively went through in the query process, where the attributes include at least one of color, size, and shape.

Figure 14:
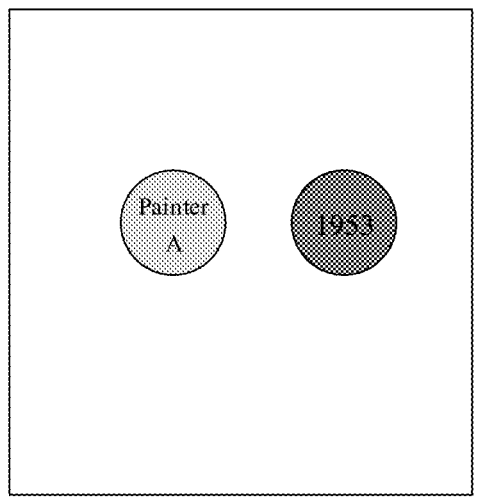
FIG. 14 schematically shows a schematic diagram of obtaining a reasoning path corresponding to the input question 1 according to an embodiment of the present disclosure.
Figure 15:
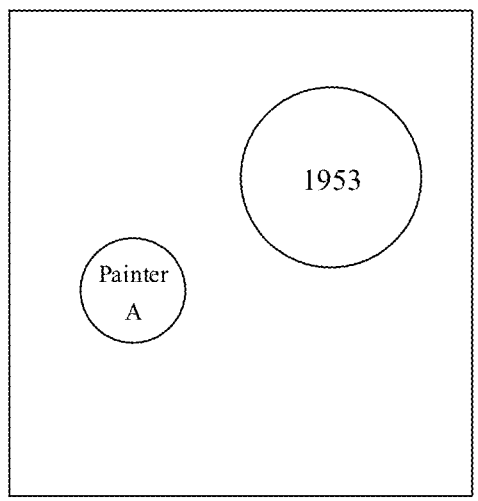
FIG. 15 schematically shows a schematic diagram of obtaining a reasoning path corresponding to the input question 1 according to an embodiment of the present disclosure.
Figure 16:
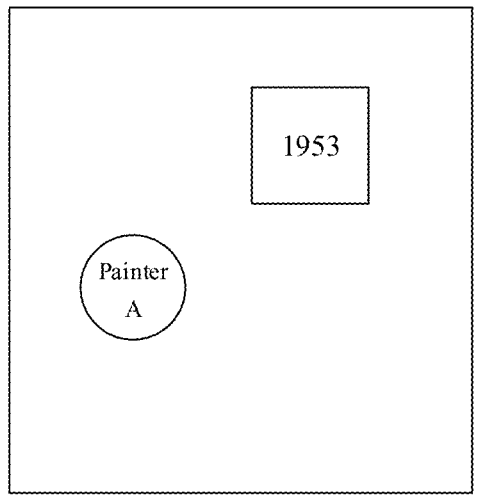
FIG. 16 schematically shows a schematic diagram of obtaining a reasoning path corresponding to the input question 1 according to an embodiment of the present disclosure.

Taking the input question 1 "which year was painter A born in" as an example, the entities went through by this input question 1 include "painter A" and "1953". In this reasoning process, as shown in FIG. 14, the directional identifier can be entity "painter A" and entity "1953" that are progressive through the color depth; they can also be entity "painter A" and entity "1953" with different sizes as shown in FIG. 15; they can also be entity "painter A" and entity "1953" with different shapes, as shown in FIG. 16. In addition, it may be other multiple entities that meet the above definition, which is not particularly limited in this example implementation.

So far, the reasoning paths corresponding to the input questions 1 to 3 have been marked in the sub-graph of the knowledge graph. In this exemplary embodiment, in order to facilitate the user to distinguish the reasoning paths of each input question, the reasoning paths corresponding to different input questions may be displayed differentially based on the above-mentioned directional identifier. Taking the directional identifier as a directional arrow as an example, arrows of different colors can also be used to mark the reasoning paths corresponding to different input questions. For example, the red arrow is used to mark the reasoning path of the input question 1, the green arrow is used to mark the reasoning path of the input question 2, and the blue arrow is used to mark the reasoning path of the input question 3. In addition, the reasoning paths corresponding to different input questions can also be displayed differentially based on characteristics such as the thickness of the arrow, a dotted or solid line of the arrow, which is not specifically limited in the embodiment of this example.

It should be noted that the above scenario is only an exemplary description, and the protection scope of this example embodiment is not limited to this. The above process is also suitable for more than three rounds of interaction and higher-order input questions. The process of marking the reasoning path with the directional identifier is the same. In addition, the above-mentioned input question may also be any other question that the user wants to inquire, which is not particularly limited in this exemplary embodiment.

In this exemplary embodiment, after the answers to the aforementioned input questions are inquired, the inquired answers are output to the user. For example, the above answer can be played to the user through voice output, the above answer can also be displayed to the user in the display area, and it can also be fed back to the user through other interactive manners that can achieve the same effect, which is not particularly limited in the exemplary embodiment.

In addition, when the queried answers are output, this exemplary embodiment can also obtain objects of interest to the user based on factors such as input questions, queried answers, user attributes and behaviors, and recommend them to the user. The specific implementation of this process may including obtaining user attribute data and user behavior data; obtaining recommended objects according to the obtained user attribute data and user behavior data; and differentially displaying the above recommended objects in the above display area.

In the above process, the user attribute data may include the user's age, gender, and purchasing power and other attribute information, and the user behavior data may include the user's historical search data, user operation data and other behavior information. The recommended objects can be objects that may be of interest to users based on search data, or related products recommended to users based on operational goals, or current affairs hotspot contents based on big data analysis, or other objects recommended to the users, which all belong to the protection scope of this example implementation.

Taking the input question "what is the representative work of painter A" as an example, it is inquired that the answer to the input question is the painting X. Then, the user attribute data and user behavior data are obtained. Based on the user attribute data, it is obtained that the age group of the user is a young group. Based on the user behavior data, it is obtained that the user has searched for backpacks, and then a backpack with the painting X as the theme can be recommended to the user.

In addition, it is also possible to recommend electronic picture frame products to users first according to the operational goals, according to that the input question is related to art paintings, and to determine that the electronic picture frame I is suitable for playing art paintings. Therefore, the electronic picture frame I can be recommended to the user.

In addition, according to the content of the physical painting X, the paintings related to the painting can be extended. For example, if the theme of the painting X is flowers and the genre is impressionism, then paintings S with the same theme and similar genres can be recommended to the user.

It should be noted that the above scenario is only an exemplary description, which does not limit the protection scope of the exemplary embodiment.

In this exemplary embodiment, in the above process, after the recommended object is obtained, the obtained recommended object can also be displayed in the above display area differentially, so as to distinguish the entity and relationship of the recommended object from the question answering entity and relationship. For example, the distinguishing display can take the following manners: (1) differentially displaying entities related to the recommended object; receiving control operations acting on the entity, and displaying the recommended object according to the control operation; (2) displaying the recommended object and the relationship connected with the recommended object with a dotted line, where the recommended object is displayed in the sub-graph of the knowledge graph in the form of an entity; (3) popping up a message prompt window, and displaying the recommended object in the message prompt window. In addition, other technical means that can achieve a distinctive display effect can also be adopted, which is not particularly limited in the exemplary embodiment.

Figure 17:
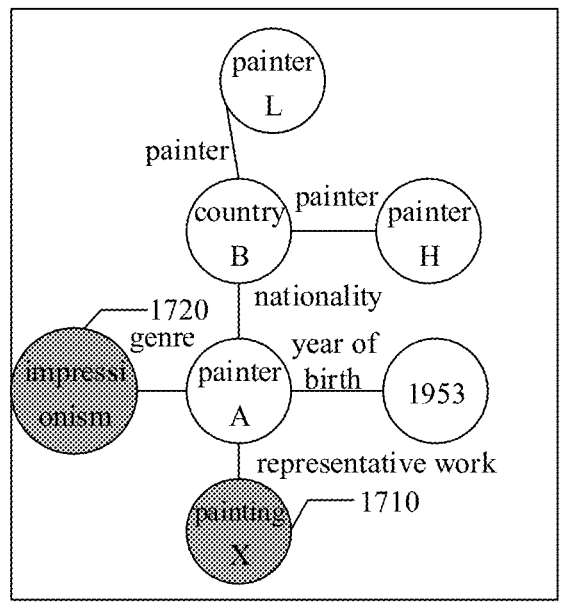
FIG. 17 schematically shows a schematic diagram of differentially displaying recommended objects according to an embodiment of the present disclosure.

Taking the above-mentioned scene of obtaining recommended objects as an example, the obtained recommended objects include a backpack with a painting X as the theme, an electronic picture frame I, and a painting S. As shown in FIG. 17, the entities "painting X" 1710 and "impressionist" 1720 with recommended objects can be displayed differently. Taking "painting X" as an example to illustrate, different colors are used to fill the entity "painting X" frame, to remind the user that there is a recommended object related to the entity; the control operation acting on the entity is received, and the recommended object is displayed according to the control operation. For example, in response to a click operation on the entity "painting X", the details of the recommended object are displayed. In addition, the user can display the recommended objects related to the entity "painting X" through voice control.

Figure 18:
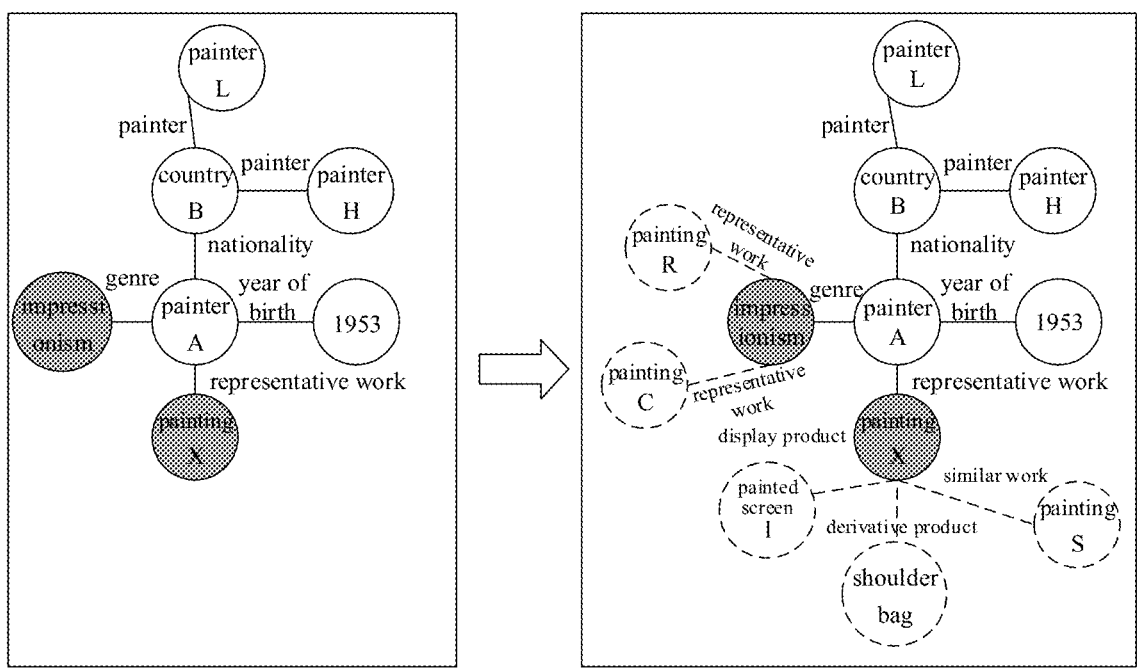
FIG. 18 schematically shows a schematic diagram of differentially displaying recommended objects according to an embodiment of the present disclosure.

In addition, the recommended objects can also be displayed in the form of entities, and in order to distinguish between the entities and relationships of the recommended objects and the question answering, a dotted line is used to display the recommended object and the relationship connected to the recommended object. As shown in FIG. 18, the dotted line is used to display the relationship connected to the painting X, i.e., "display product", "derivative product" and "similar work", and the entities connected to the relationship, i.e., "backpack with the theme of painting X", "electronic picture frame I" and "painting S", the relationship "representative work" connected with "impressionism", and the entities "painting R" and "painting C" connected to the relationship "representative work".

In addition, a message prompt window can also be popped up, and the recommended object is displayed in the message prompt window. For example, in response to the user's operation of clicking the entity "painting X", a message prompt window pops up, in which the product details of the "electronic picture frame I" are displayed.

After obtaining the recommended object, in this exemplary embodiment, the user can also perform subsequent operations such as purchasing or collecting the recommended object. For example, the collection and purchase of products can be controlled according to the user's voice instructions. When the voice input of "help me collect the painting X" is detected, the corresponding collection operation will be executed. When control of the purchase operation is detected, the payment interface may also be displayed on the system interface, and the payment is confirmed according to the user's voice. When the payment is made, the system authenticates the user's identity according to voiceprint recognition or facial recognition and then conducts the payment to complete the purchase process.

It should be noted that the above scenario is only an exemplary description, and does not limit the protection scope of the exemplary embodiment.

In this exemplary embodiment, in addition to recommending recommended objects such as products to the user, it is also possible to recommend questions that the user is interested in, so as to promote the progress of multiple rounds of dialogue and improve the efficiency of interaction. This process can be implemented as follows: obtaining entities and relationships related to the questions and answers, and obtaining multiple recommendation questions based on the obtained entities and relationships; sorting the obtained recommendation questions, and outputting the recommendation questions with the highest ranking. It can be displayed in the display area, and it can also be played to the user by voice, which is not particularly limited in the implementation of this example.

When the above answer is fed back to the user, it is also necessary to display the acquired sub-graphs of the knowledge graph and the reasoning path in the above display area. However, as the dialogue progresses, the number of input questions increases, the number of entities involved also increases. If all entities are displayed in the display area, it will cause confusion in the interface, poor display effect, and users' inability to quickly obtain important information. Therefore, in order to solve the above-mentioned question, the human-computer interaction method provided by this example embodiment displays the selected sub-graphs of the knowledge graph. The specific implementation can be as follows: selecting entities according to a preset screening rule; displaying the sub-graph of the knowledge graph containing the selected entity in the display area.

Specifically, the foregoing selection of entities according to the preset screening rule may include sorting the entities based on a recommendation algorithm, and obtaining the sorted entities. For example, it is possible to obtain the user-interested content based on user attribute information and user behavior, sort the obtained content based on a recommendation algorithm, and select the entity with the highest ranking. In addition, entities can also be selected based on other factors, for example, based on operational goals, product features or information pre-stored in the system; or based on big data analysis to recommend the current hot content, for example, to filter entities based on weather or geographic locations, all of which belong to the protection scope of this example implementation.

Figure 19:
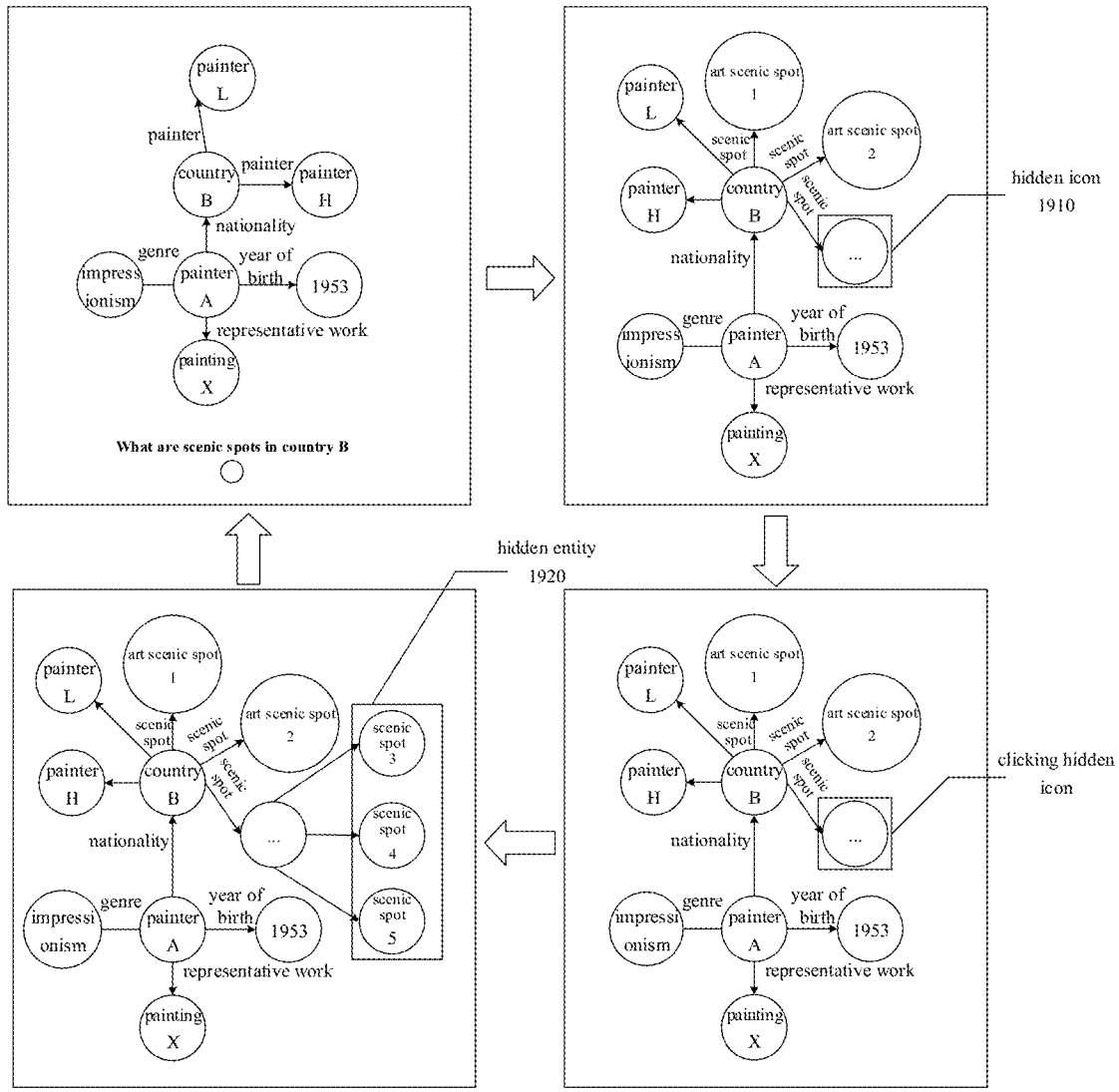
FIG. 19 schematically shows a schematic diagram of displaying a sub-graph of a knowledge graph containing a selected entity according to an embodiment of the present disclosure.

Taking the current input question "what are the scenic spots in country B" as an example, as shown in FIG. 19, according to the user's search history input questions 1 to 3, it can be judged that the user is interested in artistic paintings, then when the sub-graph of the knowledge graph corresponding to the current input question is displayed, only the artistic scenic spot entity is displayed, and other scenic spot entities are hidden. At the same time, a hidden icon 1910 can be displayed where there is a hidden entity or a relationship, to prompt the user that there is a hidden entity 1920 here. When the user clicks the hidden icon, the corresponding hidden entity is displayed. It should be noted that the above scenario is only an exemplary description, and does not limit the protection scope of the exemplary embodiment.

Figure 20:
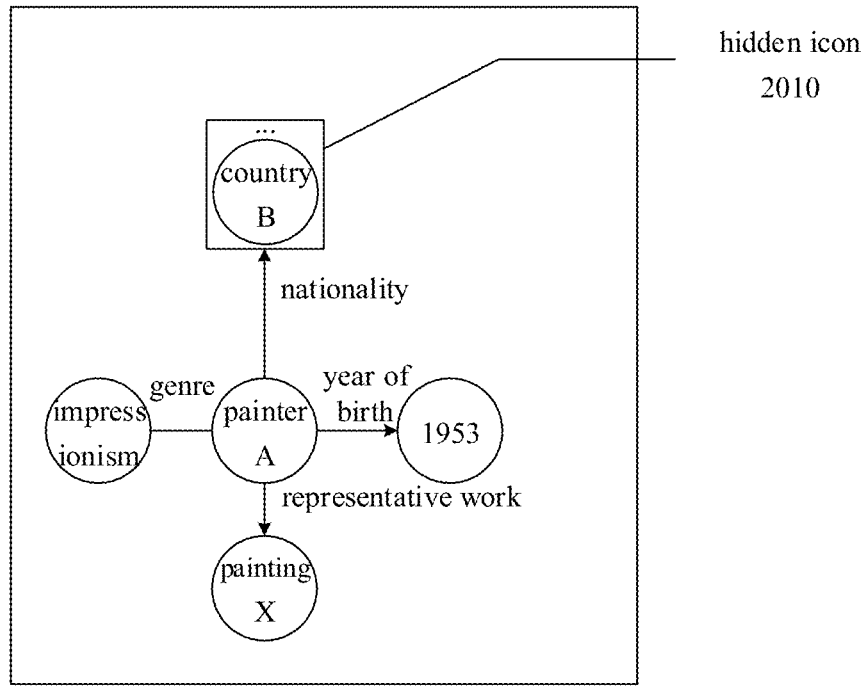
FIG. 20 schematically shows a schematic diagram of displaying a sub-graph of a knowledge graph containing a selected entity according to an embodiment of the present disclosure.

In this exemplary embodiment, the entities displayed in the sub-graph of the knowledge graph can also be selected based on the user's control operation. The implementation may be as follows: in response to a selection operation acting on an entity, hiding the branch centered on the entity and displaying the hidden icon, where the branch includes all entities, relationships, and directional identifiers connected to the entity. As shown in FIG. 20, since there are many entities connected to country B, the user can click on an entity to control the hiding of the branch centered on that entity, that is, to hide all the entities, relationships, and reasoning path arrows connected to the entity. A hidden icon 2010 is displayed on the entity to remind the user that there is a hidden entity. When the user clicks on the entity again, the hidden entities, relationships and reasoning path arrows are displayed.

Figure 21:
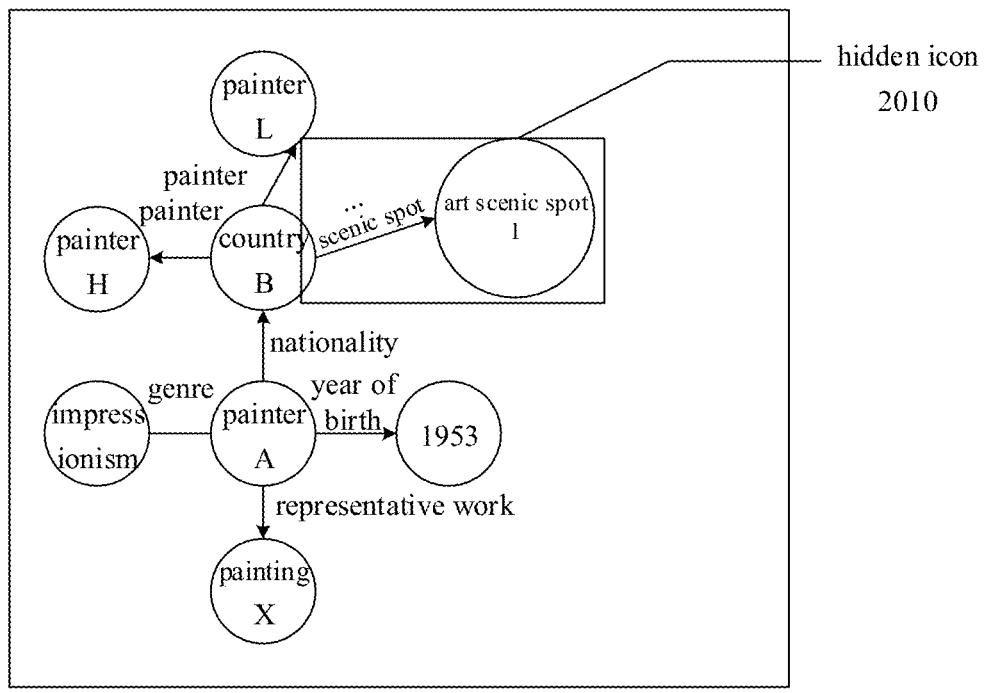
FIG. 21 schematically shows a schematic diagram of displaying a sub-graph of a knowledge graph containing a selected entity according to an embodiment of the present disclosure.

In addition, the above process can also be implemented by the following manner: in response to a selection operation acting on a relationship, hiding all entities connected to the relationship and displaying the hidden icon. As shown in FIG. 21, by an operation of selecting the relationship "scenic spot", the entities of the same type are hidden, and the hidden icon 2110 is displayed at the relationship.

Figure 22:
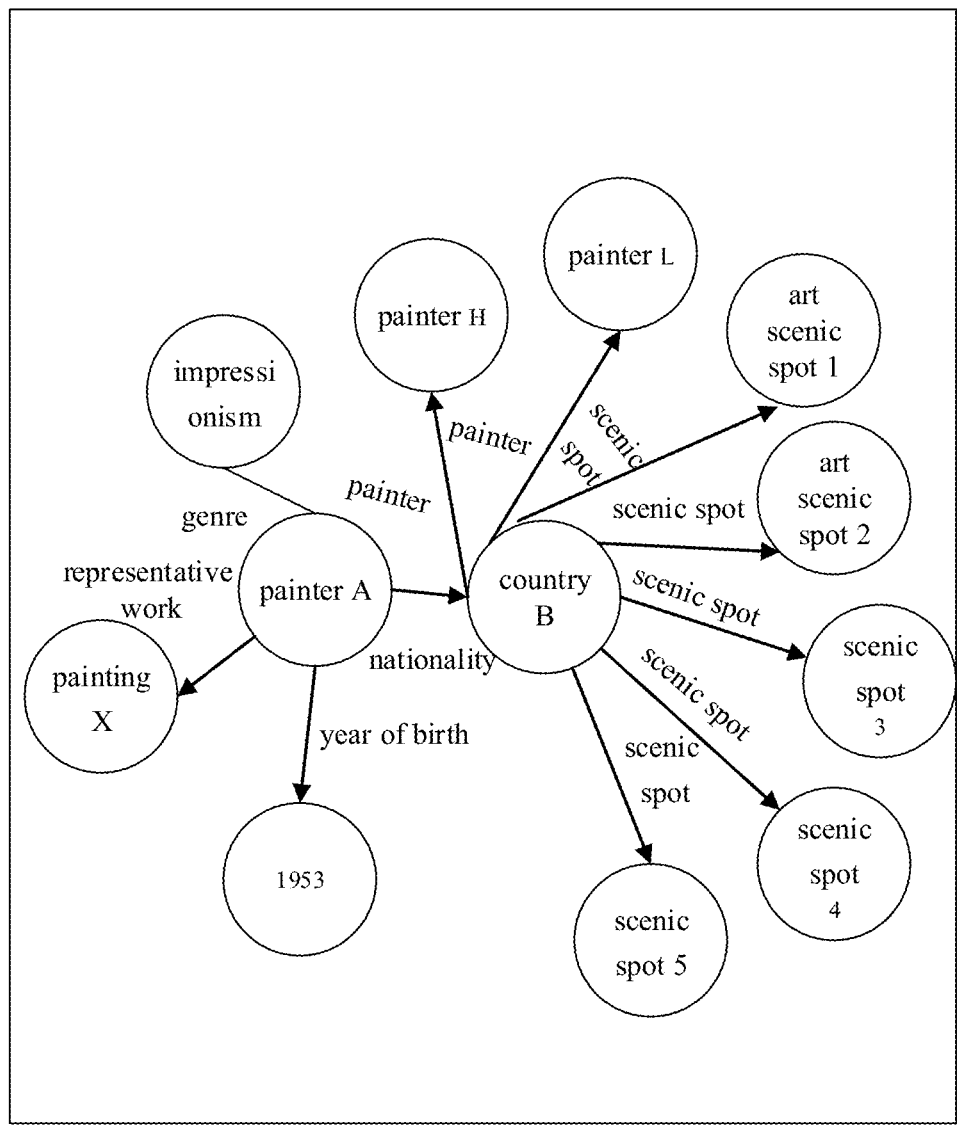
FIG. 22 schematically shows a schematic diagram of displaying a sub-graph of a knowledge graph containing a selected entity according to an embodiment of the present disclosure.

The above process can also be realized through the control operation of the display area, which can be specifically as follows: receiving the control operation for the display area, and adjusting the position of the entity in the sub-graph of the knowledge graph according to the control operation, wherein the control operation is a click or move operation. As shown in FIG. 22, the user selects an entity and re-lays out the sub-graphs with the entity as the center, or the user drags the entity to adjust the relative position of each entity in the sub-graph.

It should be noted that the above scenario is only an exemplary description and does not limit this example embodiment. Other methods for selecting entities displayed in the sub-graph of the knowledge graph based on user control operations also belong to the protection scope of this example embodiment.

In this exemplary embodiment, in addition to the above-mentioned recommendation algorithm to sort and select entities and user-based control operations to select entities displayed in the sub-graph of the knowledge graph, another rule for selecting entities is also provided. The specific implementation can be as follows: detecting the degree of association between the current input question and the previous dialog entity, and determining whether to delete the previous sub-graph according to the degree of association. If it is not relevant, the original sub-graph of knowledge graph is deleted, the new sub-graph of knowledge graph corresponding to the current input question is obtained and displayed; if it is relevant, it continues to add entities and relationships to the original sub-graph of knowledge graph.

It should be noted that the above scenario is only an exemplary description, and does not limit the exemplary embodiment, and other methods for selecting entities also belong to the protection scope of the exemplary embodiment.

In this exemplary embodiment, the corresponding system function can also be activated according to the inquired answer to the input question. For example, when it is judged that the input question is in the field of art, the user can be automatically asked whether to play related paintings. Taking the input question "which country is painter A" as an example, after the answer is obtained, the answer "country B" will be automatically played by voice, and the obtained sub-graph of knowledge graph and the reasoning path will be displayed in the display area, and the user will be automatically asked "do you want to see the Mona Lisa painting?" at the same time. If the user confirms to play, it will switch to the corresponding painting. The display manner of the painting can be displayed in a layered manner with the above-mentioned sub-graph of the knowledge graph. The sub-graph is transparently displayed above the painting so as not to affect the appreciation of the painting; the sub-graph of the knowledge graph and the painting can also be displayed in different areas, and other display manners can also be adopted. All of these manners belong to the protection scope of this example implementation.

Figure 23:
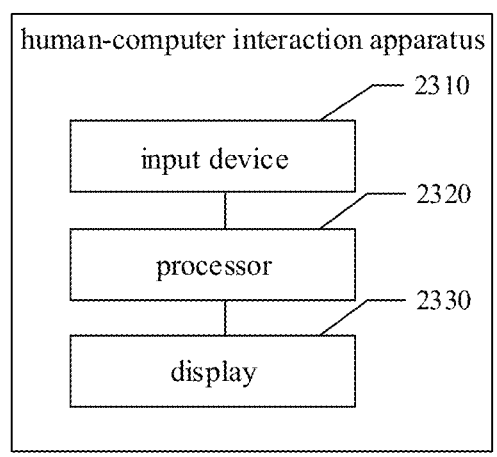
FIG. 23 schematically shows a block diagram of a human-computer interaction apparatus according to an embodiment of the present disclosure.

Correspondingly, this exemplary embodiment provides a human-computer interaction apparatus. Referring to FIG. 23, the human-computer interaction apparatus 2300 may include an input device 2310, a processor 2320, and a display 2330.

The input device 2310 is configured to receive an input question.

The processor 2320 is configured to extract entities and relationships involved in the input question, and query an answer to the input question in a knowledge graph according to the entities and the relationships.

The display 2320 is configured to display a sub-graph of the knowledge graph, wherein the sub-graph of the knowledge graph includes entities involved in the input question and the answer, and a directional identifier, wherein the directional identifier is configured to identify a reasoning path corresponding to the query process.

The above-mentioned input device may be a touch screen or a button; the processor may be a cloud server; the display may be an LCD, an OLED, etc., which is not particularly limited in the embodiment of this example.

The specific details of each sub-circuit or unit in the above-mentioned human-computer interaction apparatus have been described in detail in the corresponding human-computer interaction method, and therefore will not be repeated here.

It should be noted that although several sub-circuits or units of the device for action execution are mentioned in the above detailed description, this division is not mandatory. In fact, according to the embodiments of the present disclosure, the features, and functions of two or more sub-circuits or units described above may be embodied in one sub-circuit or unit. Conversely, the features and functions of a sub-circuit or unit described above can be further divided into multiple sub-circuits or units to be embodied.

As another aspect, the present application also provides a computer-readable medium. The computer-readable medium may be included in the electronic device described in the above-mentioned embodiment; or it may exist alone without being assembled into the electronic device. The above-mentioned computer-readable medium carries one or more programs, and when the above-mentioned one or more programs are executed by an electronic device, the electronic device realizes the method described in the above-mentioned embodiment. For example, the electronic device may implement various steps as shown in FIGS. 3-22.

It should be noted that the computer-readable medium shown in the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, device, or element, or a combination of any of the above. More specific examples of computer-readable storage media may include, but are not limited to: electrical connections with one or more wires, portable computer disks, hard disks, random access memory (RAM), read-only memory (ROM), erasable Programmable read-only memory (EPROM or flash memory), optical fiber, portable compact disk read-only memory (CD-ROM), optical storage device, magnetic storage device, or any suitable combination of the above. In the present disclosure, a computer-readable storage medium may be any tangible medium that contains or stores a program, and the program may be used by or in combination with an instruction execution system, apparatus, or device. In the present disclosure, a computer-readable signal medium may be included in a baseband or serve as a data signal propagated as a part of a carrier wave, and a computer-readable program code is carried therein. This propagated data signal can take many forms, including but not limited to electromagnetic signals, optical signals, or any suitable combination of the foregoing. The computer-readable signal medium may also be any computer-readable medium other than a computer-readable storage medium. The computer-readable medium may send, propagate, or transmit the program for use by or in combination with the instruction execution system, apparatus, or device. The program code contained on the computer-readable medium can be transmitted by any suitable medium including, but not limited to, wireless, wire, optical cable, RF, etc., or any suitable combination thereof.

It should be understood that the present disclosure is not limited to the precise structure that has been described above and shown in the drawings, and various modifications and changes can be made without departing from its scope. The scope of the present disclosure is only limited by the appended claims.

What is claimed is:

1. A human-computer interaction method, comprising:
receiving, by a terminal device, an input question;
extracting, by a terminal device, entities and relationships involved in the input question;
querying, by a server, an answer to the input question in a knowledge graph according to the entities and the relationships;
displaying, by a terminal device, a sub-graph of the knowledge graph, wherein the sub-graph of the knowledge graph comprises entities involved in the input question and the answer, and a directional identifier, wherein the directional identifier is configured to identify a reasoning path corresponding to the query process; and
in an instance in which the sub-graph of the knowledge graph is displayed by the terminal device:
detecting a degree of association between a current input question and a previous dialog entity, and determining whether to delete a previous sub-graph of the knowledge graph based on the degree of association;
in response to determining that the current input question and a previous dialog entity are not relevant, deleting the previous sub-graph of the knowledge graph, obtaining and displaying a new sub-graph of the knowledge graph corresponding to the current input question; and
in response to determining that the current input question and a previous dialog entity are relevant, continuing to add entities and relationships to the previous sub-graph of the knowledge graph,
wherein, in the instance in which the sub-graph of the knowledge graph is displayed by the terminal device, the method further comprises:
acquiring at least one of user attribute data, user behavior data, and operation data, wherein the user attribute data comprises at least one of age, gender, and purchasing power of a user, and the user behavior data comprises historical search data;
acquiring a recommended object according to at least one of the user attribute data, the user behavior data, and the operation data; and
displaying differentially the recommended object relative to the entity in the sub-graph of the knowledge graph,
wherein displaying differentially the recommended object relative to the entity in the sub-graph of the knowledge graph comprises:
popping up a message prompt window in response to an operation of a user of clicking the entity, and displaying the recommended object in the message prompt window.

2. The human-computer interaction method according to claim 1, wherein the directional identifier is configured to connect entities that are successively analyzed in the query process.

3. The human-computer interaction method according to claim 2, wherein:
the input question is a multi-order reasoning question;
in response to the input question being the multi-order reasoning question, the directional identifier comprises a multi-level directional identifier to distinguish the successively corresponding reasoning path of each order in the query process; and
any two of the multi-level directional identifiers have at least one of different colors, sizes, and shapes.

4. The human-computer interaction method according to claim 1, wherein the directional identifier is a directional arrow.

5. The human-computer interaction method according to claim 1, wherein the directional identifier is represented by a plurality of entities with different attributes that are successively analyzed in the query process, and the attribute comprises at least one of color, size, and shape.

6. The human-computer interaction method according to claim 1, wherein, in an instance in which the input question is greater than or equal to a second round of question and answer interaction, displaying the sub-graph of the knowledge graph comprises:
judging whether the input question and the answer involve a new entity compared with the input question and answer of a previous round of interaction;
updating the new entity and the corresponding directional identifier to the sub-graph of the knowledge graph obtained in the previous round of interaction, and displaying an updated sub-graph of the knowledge graph, if it involves a new entity; and
serving the sub-graph of the knowledge graph obtained in the previous round of interaction as the sub-graph of the knowledge graph, and updating the directional identifier, if it does not involve a new entity.

7. The human-computer interaction method according to claim 6, further comprising: displaying differentially the reasoning paths corresponding to different input questions based on the directional identifier.

8. The human-computer interaction method according to claim 1, wherein displaying differentially the recommended object relative to the entity in the sub-graph of the knowledge graph comprises:
displaying differentially a target entity by color filling or a symbol mark in the sub-graph of the knowledge graph, wherein the target entity is an entity connected to the recommended object through a relationship; and
receiving a control operation acting on the target entity, and displaying the recommended object based on the control operation.

9. The human-computer interaction method according to claim 1, wherein displaying differentially the recommended object relative to the entity in the sub-graph of the knowledge graph comprises:
displaying the recommended object and a relationship connected to the recommended object with a dashed line, wherein the recommended object is displayed in the sub-graph of the knowledge graph in a form of an entity.

10. The human-computer interaction method according to claim 1, wherein displaying a sub-graph of the knowledge graph comprises:
selecting among the entities involved in the input question and the answer according to a preset screening rule; and
displaying the sub-graph of the knowledge graph, wherein the sub-graph of the knowledge graph comprises the selected entity and the directional identifier.

11. The human-computer interaction method according to claim 10, wherein selecting among the entities involved in the input question and the answer according to a preset screening rule comprises:
in response to a control operation of a user, selecting a display state of the entity and its related entities according to the control operation,
wherein selecting a display state of the entity and its related entities according to the control operation comprises:
in response to a selection operation acting on an entity, hiding a branch centered on the entity and displaying a hidden icon, wherein the branch comprises all entities, relationships, and directional identifiers connected to the entity; or, in response to a selection operation acting on a relationship, hiding all the entities connected to the relationship and displaying the hidden icon.

12. A non-transitory computer-readable storage medium with program instructions stored thereon that, when executed by at least one hardware processor, directs the at least one hardware processor to perform a method for human-computer interaction, comprising:

receiving, by a terminal device, an input question;

extracting, by a terminal device, entities and relationships involved in the input question;

querying, by a server, an answer to the input question in a knowledge graph according to the entities and the relationships;

displaying, by a terminal device, a sub-graph of the knowledge graph, wherein the sub-graph of the knowledge graph comprises entities involved in the input question and the answer, and a directional identifier, wherein the directional identifier is configured to identify a reasoning path corresponding to the query process; and in an instance in which the sub-graph of the knowledge graph is displayed by the terminal device:

detecting a degree of association between a current input question and a previous dialog entity, and determining whether to delete a previous sub-graph of the knowledge graph based on the degree of association;

in response to determining that the current input question and a previous dialog entity are not relevant, deleting the previous sub-graph of the knowledge graph, obtaining and displaying a new sub-graph of the knowledge graph corresponding to the current input question; and in response to determining that the current input question and a previous dialog entity are relevant, continuing to add entities and relationships to the previous sub-graph of the knowledge graph, wherein, in the instance in which the sub-graph of the knowledge graph is displayed by the terminal device, the method further comprises:

acquiring at least one of user attribute data, user behavior data, and operation data, wherein the user attribute data comprises at least one of age, gender, and purchasing power of a user, and the user behavior data comprises historical search data;

acquiring a recommended object according to at least one of the user attribute data, the user behavior data, and the operation data; and displaying differentially the recommended object relative to the entity in the sub-graph of the knowledge graph, wherein displaying differentially the recommended object relative to the entity in the sub-graph of the knowledge graph comprises:

popping up a message prompt window in response to an operation of a user of clicking the entity, and displaying the recommended object in the message prompt window.

13. The non-transitory computer-readable storage medium according to claim 12, wherein the directional identifier is configured to connect entities that are successively analyzed in the query process.

14. The non-transitory computer-readable storage medium according to claim 13, wherein:

in response to the input question being a multi-order reasoning question, the directional identifier comprises a multi-level directional identifier to distinguish the successively corresponding reasoning path of each order in the query process; and any two of the multi-level directional identifiers have at least one of different colors, sizes, and shapes.

15. The non-transitory computer-readable storage medium according to claim 12, wherein the directional identifier is a directional arrow.

16. A system, comprising:

at least one computing device comprising at least one hardware processor; and a memory storing program instructions executable by the at least one hardware processor that, when executed, direct the at least one computing device to implement a human-computer interaction method, comprising:

receiving, by a terminal device, an input question;

extracting, by a terminal device, entities and relationships involved in the input question;

querying, by a server, an answer to the input question in a knowledge graph according to the entities and the relationships;

displaying, by a terminal device, a sub-graph of the knowledge graph, wherein the sub-graph of the knowledge graph comprises entities involved in the input question and the answer, and a directional identifier, wherein the directional identifier is configured to identify a reasoning path corresponding to the query process; and in an instance in which the sub-graph of the knowledge graph is displayed by the terminal device:

detecting a degree of association between a current input question and a previous dialog entity, and determining whether to delete a previous sub-graph of the knowledge graph based on the degree of association;

in response to determining that the current input question and a previous dialog entity are not relevant, deleting the previous sub-graph of the knowledge graph, obtaining and displaying a new sub-graph of the knowledge graph corresponding to the current input question; and in response to determining that the current input question and a previous dialog entity are relevant, continuing to add entities and relationships to the previous sub-graph of the knowledge graph, wherein, in the instance in which the sub-graph of the knowledge graph is displayed by the terminal device, the method further comprises:

acquiring at least one of user attribute data, user behavior data, and operation data, wherein the user attribute data comprises at least one of age, gender, and purchasing power of a user, and the user behavior data comprises historical search data;

acquiring a recommended object according to at least one of the user attribute data, the user behavior data, and the operation data; and displaying differentially the recommended object relative to the entity in the sub-graph of the knowledge graph, wherein displaying differentially the recommended object relative to the entity in the sub-graph of the knowledge graph comprises:

popping up a message prompt window in response to an operation of a user of clicking the entity, and displaying the recommended object in the message prompt window.

17. The system according to claim 16, wherein the directional identifier is configured to connect entities that are successively went through in the query process.

18. The system according to claim 17, wherein:
in response to the input question being a multi-order reasoning question, the directional identifier comprises a multi-level directional identifier to distinguish the successively corresponding reasoning path of each order in the query process; and
any two of the multi-level directional identifiers have at least one of different colors, sizes, and shapes.

19. The system according to claim 16, wherein the directional identifier is a directional arrow.

\* \* \* \* \*